(12) United States Patent
Kwon et al.

(10) Patent No.: US 10,219,667 B2
(45) Date of Patent: Mar. 5, 2019

(54) VACUUM CLEANER AND BATTERY ASSEMBLY

(71) Applicant: LG ELECTRONICS INC., Seoul (KR)

(72) Inventors: Dongho Kwon, Seoul (KR); Deokwon Kang, Seoul (KR); Seonghoon Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 188 days.

(21) Appl. No.: 15/223,456

(22) Filed: Jul. 29, 2016

(65) Prior Publication Data

US 2017/0027399 A1    Feb. 2, 2017

(30) Foreign Application Priority Data

Jul. 29, 2015    (KR) ........................ 10-2015-0107478

(51) Int. Cl.
*A47L 9/28* (2006.01)
*H01M 10/613* (2014.01)
(Continued)

(52) U.S. Cl.
CPC ........... *A47L 9/2884* (2013.01); *A47L 9/2889* (2013.01); *H01M 2/1055* (2013.01);
(Continued)

(58) Field of Classification Search
CPC .. A47L 9/2884; A47L 9/2889; H01M 10/425; H01M 10/44; H01M 10/613;
(Continued)

(56) References Cited

U.S. PATENT DOCUMENTS

| 6,537,694 | B1 | 3/2003 | Sugiura et al. |
| 8,405,357 | B2 * | 3/2013 | Saeki ...................... H01M 2/34 320/134 |

(Continued)

FOREIGN PATENT DOCUMENTS

| CN | 1535123 | 10/2004 |
| CN | 101897558 | 12/2010 |

(Continued)

OTHER PUBLICATIONS

European Search Report dated Dec. 21, 2016 issued in Application No. 16181572.5.

(Continued)

*Primary Examiner* — Marc Carlson

(74) *Attorney, Agent, or Firm* — Ked & Associates, LLP

(57) ABSTRACT

A vacuum cleaner may include a cleaner body including a suction motor for generating suction force, a suction unit communicating with the cleaner body and suctioning air and dust, and a battery assembly for supplying power to the suction motor. The battery assembly may include a plurality of battery cells, an inner case including a plurality of cell cases having the plurality of battery cells respectively accommodated therein and spaced apart from each other, and an outer case having the inner case accommodated therein and including a flow hole in which air flows.

20 Claims, 9 Drawing Sheets

(51) Int. Cl.
*H01M 10/66* (2014.01)
*H01M 10/6554* (2014.01)
*H01M 10/44* (2006.01)
*H01M 2/10* (2006.01)
*H01M 10/623* (2014.01)
*H01M 2/20* (2006.01)
*H01M 10/42* (2006.01)
*H01M 10/667* (2014.01)
*H01M 10/643* (2014.01)
*H01M 10/6235* (2014.01)
*H01M 10/658* (2014.01)
*H01M 10/6563* (2014.01)
*H01M 10/6557* (2014.01)

(52) U.S. Cl.
CPC ......... *H01M 2/204* (2013.01); *H01M 10/425* (2013.01); *H01M 10/44* (2013.01); *H01M 10/623* (2015.04); *H01M 10/6235* (2015.04); *H01M 10/643* (2015.04); *H01M 10/658* (2015.04); *H01M 10/6554* (2015.04); *H01M 10/66* (2015.04); *H01M 10/667* (2015.04); *H01M 10/613* (2015.04); *H01M 10/6557* (2015.04); *H01M 10/6563* (2015.04); *H01M 2010/4271* (2013.01); *H01M 2220/30* (2013.01)

(58) Field of Classification Search
CPC ........... H01M 10/623; H01M 10/6235; H01M 10/643; H01M 10/6554; H01M 10/6557; H01M 10/6563; H01M 10/658; H01M 10/66; H01M 10/667; H01M 2010/4271; H01M 2220/30; H01M 2/1022; H01M 2/1055; H01M 2/204
See application file for complete search history.

(56) References Cited

U.S. PATENT DOCUMENTS

| | | | | |
|---|---|---|---|---|
| 8,673,487 | B2* | 3/2014 | Churchill | H01M 2/1022 15/410 |
| 8,997,311 | B2* | 4/2015 | Huber | A47L 9/00 15/413 |
| 2003/0134189 | A1* | 7/2003 | Kanai | H01M 2/105 429/156 |
| 2008/0172821 | A1* | 7/2008 | Kang | A47L 5/225 15/327.5 |
| 2012/0293128 | A1* | 11/2012 | Kim | H02J 7/0016 320/117 |
| 2012/0299549 | A1* | 11/2012 | Kim | H01M 10/0445 320/118 |
| 2013/0152333 | A1* | 6/2013 | Reed | A47L 9/2857 15/339 |
| 2013/0207615 | A1* | 8/2013 | Sunderland | H02J 7/0063 320/135 |
| 2014/0101887 | A1* | 4/2014 | Reed | A47L 9/2857 15/339 |
| 2015/0155606 | A1* | 6/2015 | Stickney | A47L 9/2884 429/90 |
| 2015/0188102 | A1* | 7/2015 | Gee, II | A47L 9/2873 429/100 |
| 2016/0235267 | A1* | 8/2016 | Han | A47L 9/2884 |
| 2017/0000304 | A1* | 1/2017 | Ishizawa | A47L 9/2842 |

FOREIGN PATENT DOCUMENTS

| | | |
|---|---|---|
| CN | 102256522 | 11/2011 |
| JP | 2002-065535 | 3/2002 |
| JP | 2003-257394 | 9/2003 |
| JP | 2005-087598 | 4/2005 |
| JP | 2006-216471 | 8/2006 |
| JP | 2013-134828 | 7/2013 |
| JP | 2014-229725 | 12/2014 |
| KR | 10-1243371 | 3/2013 |
| TW | 480164 | 3/2002 |
| TW | 200418427 | 10/2004 |
| TW | 200642652 | 12/2006 |
| TW | 200824632 | 6/2008 |

OTHER PUBLICATIONS

European Search Report dated Mar. 13, 2017 issued in Application No. 16181572.5.
Korean Office Action dated May 11, 2016 issued in Application No. 10-2015-0107478.
Taiwanese Office Action (with English Translation) dated Mar. 13, 2017 issued in Application No. 105123756.

* cited by examiner

VACUUM CLEANER AND BATTERY ASSEMBLY

CROSS-REFERENCE TO RELATED APPLICATION(S)

This application claims priority under 35 U.S.C. § 119 to Korean Patent Application No. 10-2015-0107478, filed in Korea on Jul. 29, 2015, whose entire disclosure is hereby incorporated by reference.

BACKGROUND

1. Field

A vacuum cleaner and a battery assembly are disclosed herein.

2. Background

A vacuum cleaner is a device which suctions air containing dust using a suction force generated by a suction motor installed in a main body, and then filters the dust in the main body.

The vacuum cleaner is classified into a manual cleaner and an automatic cleaner. The manual cleaner is a cleaner with which a user directly performs cleaning, and the automatic cleaner is a cleaner which performs the cleaning while traveling by itself. The manual cleaner may be classified into a canister type in which a suction nozzle is provided separately from the main body, and connected through a connection tube, and an upright type in which the suction nozzle is coupled to the main body.

As a prior document, Japanese Patent Laid-Open Application No. 2003-257394 (Publication date: Sep. 12, 2003) discloses a battery pack and a rechargeable cleaner. The battery pack of the prior document includes an outer case including a blast port and an exhaust port and a plurality of secondary batteries accommodated in the outer case. Each of the plurality of secondary batteries may be accommodated and supported in a groove provided in a box-shaped container which is an example of the outer case.

However, in the related art, the plurality of secondary batteries may be spaced apart from each other in a state of being accommodated in the outer case and may be cooled by air introduced through the blast port. However, dust introduced into the outer case through the blast port along with air may be accumulated in the groove. In this case, contact failure of the secondary battery or spark ignition may occur. In addition, when water or moisture is introduced through the blast port, water is directly brought into contact with the secondary battery and thus a short circuit may be generated.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
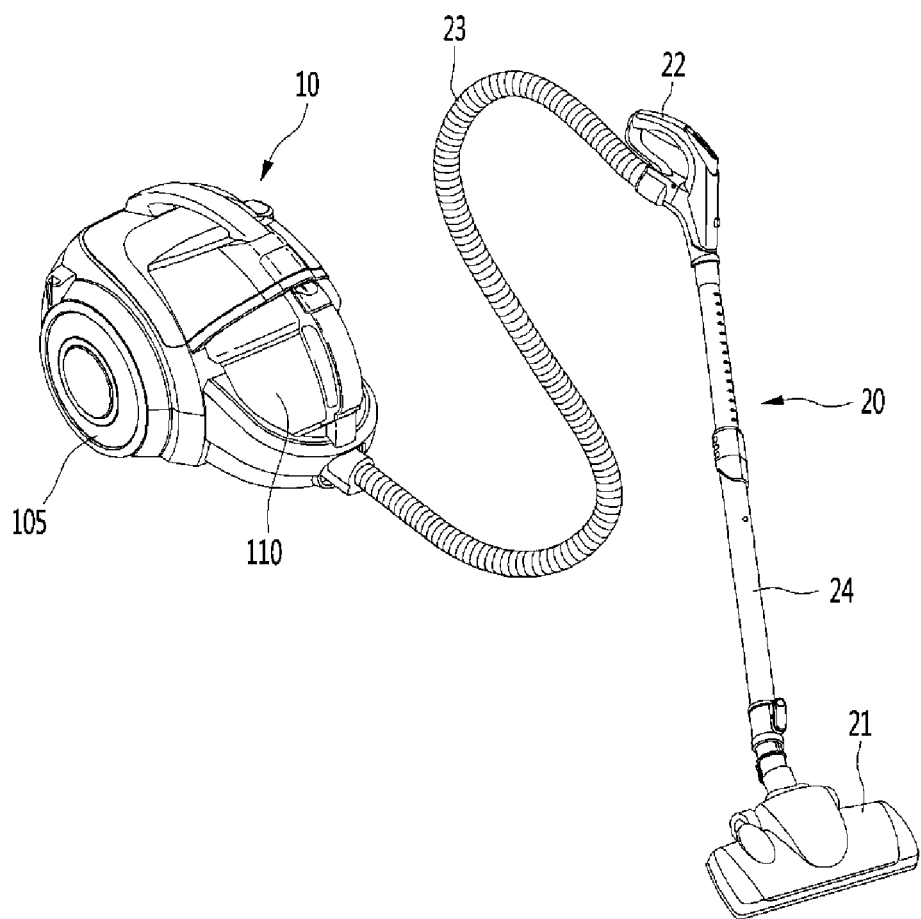
FIG. 1 is a perspective view of a vacuum cleaner according to an embodiment.
Figure 2:
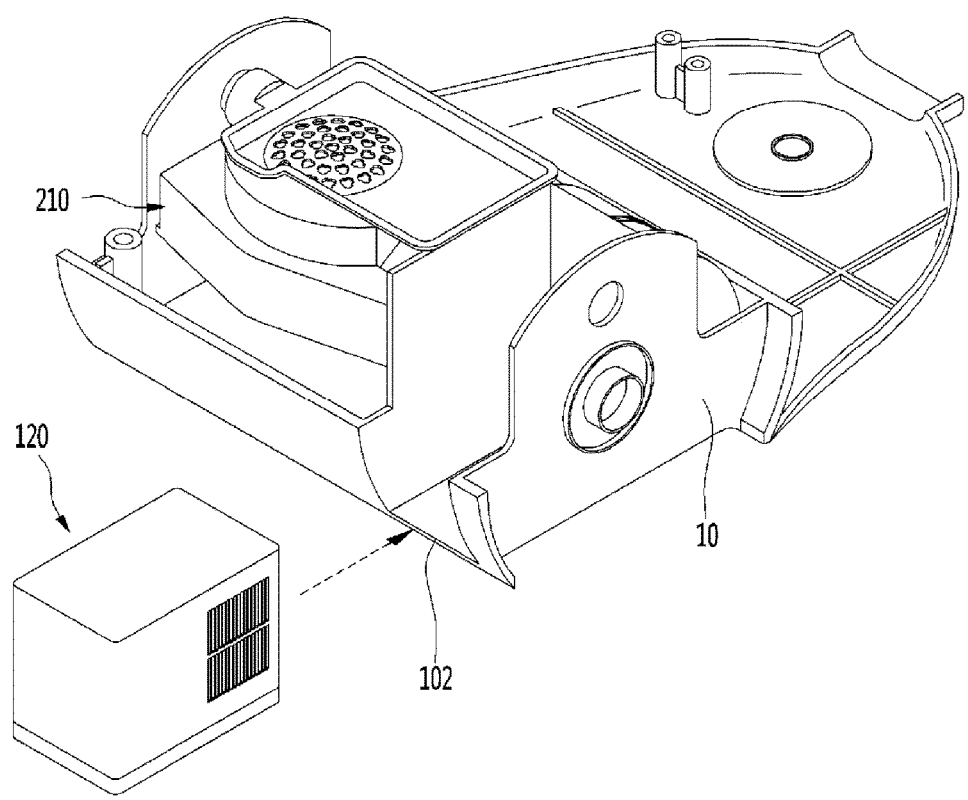
FIG. 2 is a diagram showing a state in which a battery assembly is separated from the vacuum cleaner according to the embodiment.
Figure 3:
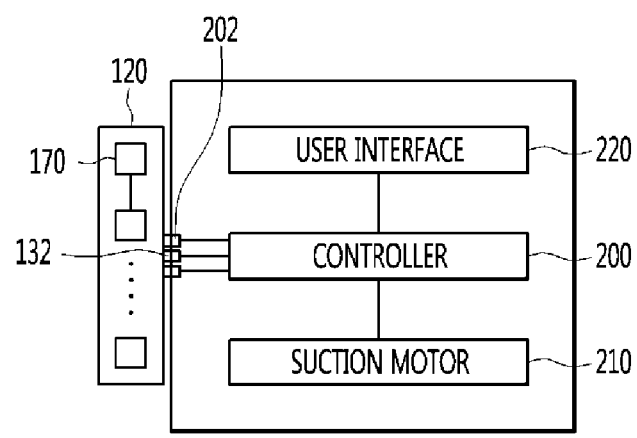
FIG. 3 is a block diagram showing the configuration of a vacuum cleaner according to the embodiment.
Figure 4:
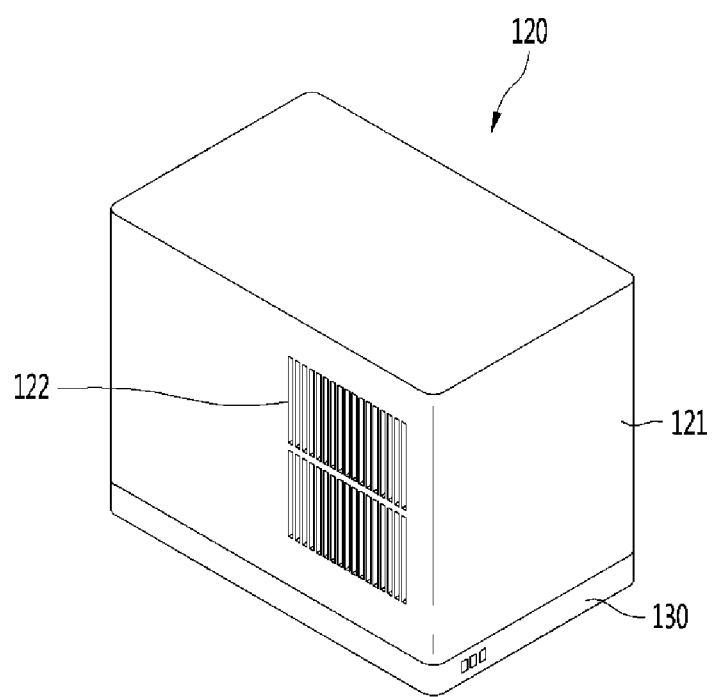
FIG. 4 is a perspective view of a battery assembly according an embodiment.
Figure 5:
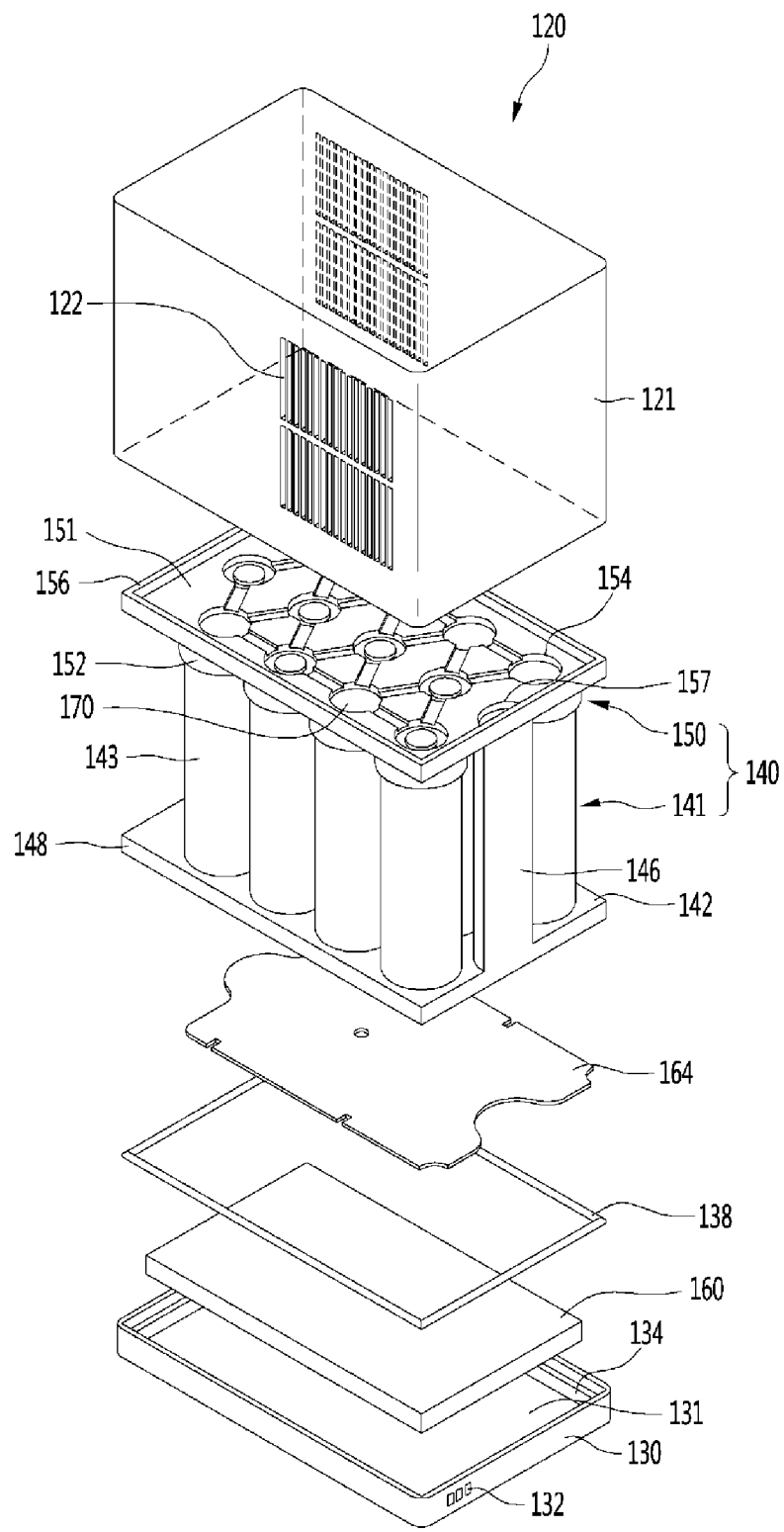
FIG. 5 is an exploded perspective view of the battery assembly of FIG. 4.
Figure 6:
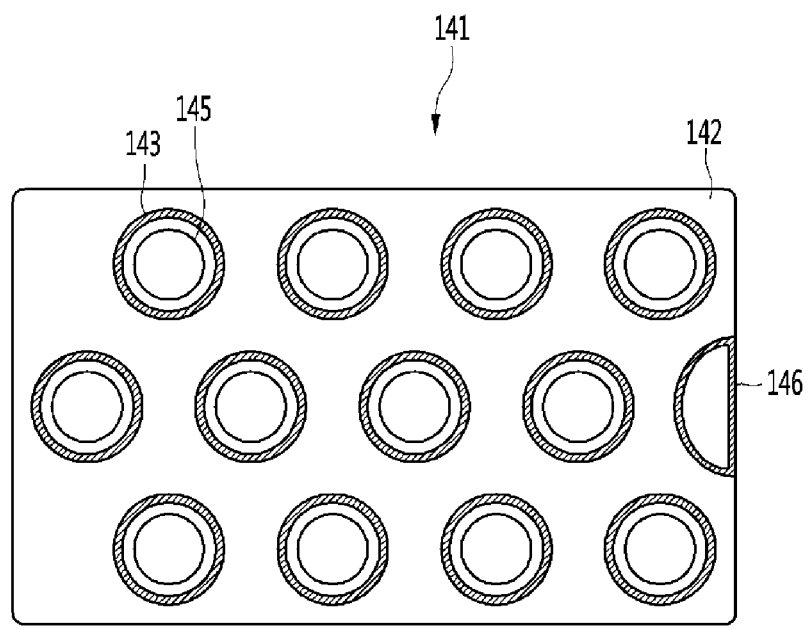
FIG. 6 is a horizontal cross-sectional view of a first inner case according to an embodiment.
Figure 7:
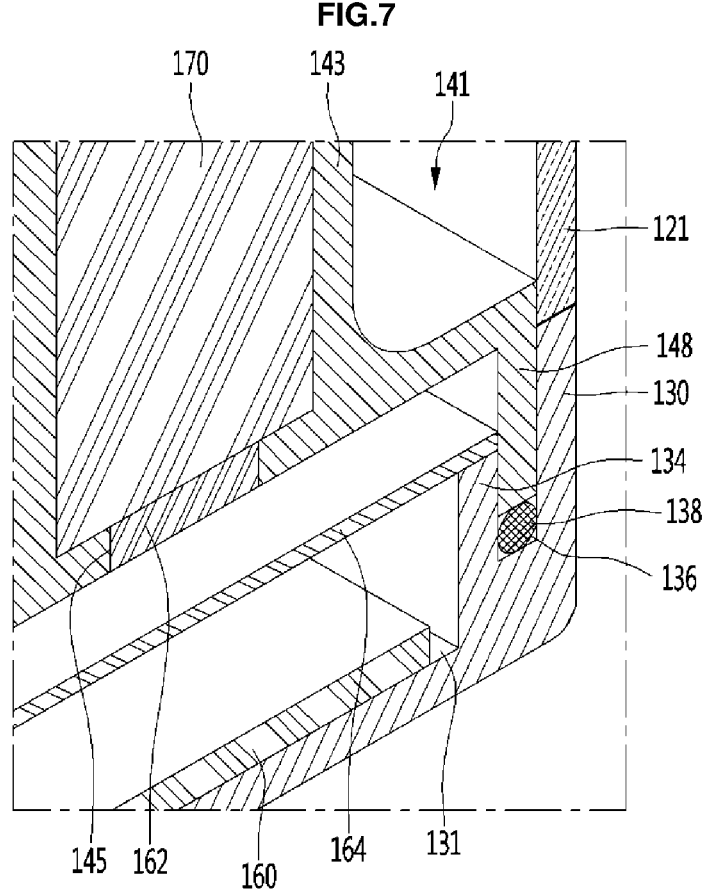
FIG. 7 is a partial cross-sectional view of the battery assembly of FIG. 4.

Referring to FIGS. 1 to 3, a vacuum cleaner 1 according to the embodiment may include a cleaner body 10 which has a suction motor 210 generating a suction force, and a suction device 20 which guides air containing dust into the cleaner body 10. The suction device 20 may include a suction unit 21 which suctions the dust on a surface to be cleaned, for example, a floor surface. Although the canister type cleaner is described as a cleaner, the present disclosure is applicable to an upright type cleaner.

The suction device 20 may further include connection units 22, 23 and 24 which connect the suction unit 21 to the cleaner body 10. The connection units 22, 23 and 24 may include an extension tube 24 which is connected to the suction unit 21, a handle 22 which is connected to the extension tube 24, and a suction hose 23 which connects the handle 22 with the cleaner body 10.

The vacuum cleaner 1 may further include a dust separator (not shown) which separates the air suctioned into the suction device 20 from the dust, and a dust container 110 which stores the dust separated in the dust separator. The dust container 110 may be separably installed at the cleaner body 10. The dust separator may be manufactured separately from the dust container 110, or may form one module with the dust container 110.

The vacuum cleaner 1 may further include a battery assembly 120 for supplying a voltage for operating the suction motor 210 and a controller 200 for controlling the suction motor 210. The cleaner body 10 includes a mounting part 102 and the battery assembly 120 may be detachably mounted in the mounting part 102.

The cleaner body 10 may include a cover member (not shown) for covering the battery assembly 120 in a state in which the battery assembly 120 is mounted in the mounting part 102. The battery assembly 120 may be positioned between the suction motor 210 and wheels 105 for moving the cleaner body 10 in a state of being mounted in the mounting part 102. Although not limited thereto, the battery assembly 120 may be mounted in the mounting part 102 from the rear side of the cleaner body 10.

The battery assembly 120 may include a first terminal 132 and the cleaner body 10 may include a second terminal 202 which is brought into contact with the first terminal 132. The second terminal 202 may be provided in the mounting part 102 and may be brought into contact with the first terminal 132 of the battery assembly 120 when the battery assembly 120 is mounted in the mounting part 102.

The battery assembly 120 may include a plurality of battery cells 170. The plurality of battery cells 170 may be secondary batteries which are chargeable and dischargeable and may be connected in series.

According to the present embodiment, the suction motor 210 may receive a voltage from the battery assembly 120. Accordingly, in the present embodiment, a cord reel, around which a power cord is wound, may be omitted.

A travel degree of freedom of the vacuum cleaner 1 may be enhanced. That is, since the vacuum cleaner 1 receives the electric power from the battery assembly 120 without a separate cord reel on which the electric wire is wound, a travel range of the vacuum cleaner 1 is not limited, and also since it is not necessary to cross the electric wire or to remove the electric wire while the vacuum cleaner 1 is traveling, it is easy to travel.

Meanwhile, the vacuum cleaner 1 may further include a user interface 220. The user interface 220 may receive an operation command of the vacuum cleaner 1, and may also display operation information or state information of the vacuum cleaner 1. The user interface 220 may be provided at one or more of the handle 22 and the cleaner body 10. The user interface 220 may include an input unit and a display unit which are formed integrally with or separately from each other.

Power-on of the vacuum cleaner 1, a cleaning mode, an intensity of the suction force and so on may be selected through the input unit. The display unit may display at least residual information of the battery assembly 120. When a residual value of the battery assembly 120 reaches a reference value, the controller 200 may control the display unit to display information notifying that it is necessary to charge the battery assembly 120.

As another example, the display unit may continuously or gradually display the residual value of the battery assembly 120. For example, the display unit may display the residual value of the battery assembly 120 in figures, by symbols or in the form of a graph. Alternatively, the display unit may include a plurality of light emitting parts, and may display the residual value of the battery assembly 120 by changing the number of light emitting parts which are turned on. Alternatively, the display unit may display the residual value of the battery assembly 120 by changing a color of light emitted from the light emitting parts.

Referring to FIGS. 4 to 7, the battery assembly 120 may include outer cases 121 and 130, an inner case 140 accommodated in the outer cases 121 and 130 and a plurality of battery cells 170 accommodated in the inner case 140. In addition, the battery assembly 120 may further include a battery management unit 160. The battery management unit 160 may manage the plurality of battery cells 170 to be maintained at a constant voltage. That is, the battery management unit 160 manages the plurality of battery cells 170 to output a constant voltage.

The outer cases 121 and 130 may include the first outer case 121 and the second outer case 130 coupled with the first outer case 121. Although not limited thereto, the second outer case 130 may be coupled to the lower side of the first outer case 121.

In the first outer case 121, flow holes 122, in which air flows, may be formed. The flow holes 120 may be formed in a plurality of surfaces of the first outer case 121, such that air introduced into the first outer case 121 is smoothly discharged to the outside of the first outer case 121. Although not limited thereto, the flow holes 122 may be formed in at least two opposite surfaces of the first outer case 121. As another example, the flow holes may be formed in the second outer case 130.

The second outer case 130 may support the inner case 140. The first outer case 121 may be coupled to the second outer case 130 while surrounding the inner case 140, in a state in which the inner case 140 is seated on the second outer case 130. The second outer case 130 may include a first terminal 132 electrically connected to the second terminal 102 of the cleaner body 10.

The battery assembly 120 may further include a partitioning plate 164 for preventing heat generated in the plurality of battery cells 170 from being delivered to the battery management unit 160. A supporter 134 supporting the partitioning plate 164 may be provided on the bottom 131 of the second outer case 130. The supporter 134 may extend upwardly from the bottom 131 of the second outer case 130.

Accordingly, in a state in which the partitioning plate 164 is seated on the supporter 134, the battery management unit 160 and the plurality of battery cells 170 may be spaced apart from the partitioning plate 164. The partitioning plate 164 may include an opening through which a wire passing through a wire case 146 passes. The wire passing through the opening may be connected to the battery management unit 160.

The inner case 140 may enable the plurality of battery cells 170 to be supported in a state of being spaced apart from each other. In addition, the inner case 140 may surround the plurality of battery cells 170 to prevent the plurality of battery cells 170 from directly contacting air, water or moisture.

The inner case 140 may include a first inner case 141 and a second inner case 150 coupled with the first inner case 141. The first inner case 141 may include a first support plate 142 supporting the plurality of battery cells 170. In addition, the first inner case 141 may include a plurality of cell cases 143 extending on the first support plate 142 and having the plurality of battery cells 170 accommodated therein.

Each of the plurality of battery cells 170 may be accommodated in each of the plurality of cell cases 143. The number of cell cases 143 is equal to the number of battery cells 170. Each battery cell 170 may be formed in a cylindrical shape, for example. Each cell case 143 may have a cylindrical shape and have a cavity. The plurality of cell cases 143 may be spaced apart from each other to cool the plurality of battery cells 170. When the plurality of battery cells 170 is supported in a state of being spaced apart from each other, heat generated in the battery cells 170 may be prevented from having influence on each other.

In addition, air may flow in a space among the plurality of cell cases 143 and each battery cell 170 accommodated in each cell case 143 may be cooled by air flowing in the space. That is, the space among the plurality of cell cases 143 serves as a cooling flow path. In addition, the cell cases 143 are spaced apart from the outer cases 121 and 130 such that air introduced into the internal space of the outer cases 121 and 130 efficiently cools the battery cells. The plurality of cell cases 143 is arranged in a plurality of rows and cell cases of one row may be located in an area between two cell cases of the other row. Accordingly, air passing through the space between two cell cases of one row divisionally flows into two portions along the circumference of the cell cases of a next row, thereby efficiently cooling the cell cases.

In the first support plate 142, a plurality of holes 145, in which conductors 162 for connecting a positive pole (+) of one battery cell 170 and a negative pole (−) of another battery cell 170 may be located, may be formed. Each of the plurality of holes 145 may be formed in an area corresponding to the area in which each cell case 143 is formed.

The diameter of each of the plurality of holes 145 may be less than that of each battery cell 170. Accordingly, the battery cells 170 may be supported by the first support plate 142 in a state of being accommodated in the cell cases 143.

The first inner case 141 may further include a fastening rib 148 for fastening with the second outer case 130. The fastening rib 148 may extend downwardly from the edge of the first support plate 142. The second outer case 130 may further include a rib accommodation part 136 in which the fastening rib 148 is accommodated. The rib accommodation part 136 may be located outside the supporter 134. A sealing member 138 may be accommodated in the rib accommodation part 136 and the fastening rib 148 may be accommodated in the rib accommodation part 136 and seated on the sealing member 138 in a state in which the sealing member 138 is accommodated in the rib accommodation part 136.

When the fastening rib 148 is accommodated in the rib accommodation part 136, the rib accommodation part 136 may be brought into contact with the supporter 134. Accordingly, the fastening rib 148 may serve to fasten the first inner case 141 and the second outer case 130 and prevent external foreign materials, moisture or water from flowing toward the battery management unit 160. In a state in which the fastening rib 148 is accommodated in the rib accommodation part 136 and seated on the sealing member 138, the first support plate 142 may be located above the battery management unit 160 and spaced apart from the battery management unit 160.

At this time, as the partitioning plate 164 is located between the first support plate 142 and the battery management unit 160, a short circuit between the battery management unit 160 and the battery cells 170 may be prevented. The first inner case 141 may further include a wire case 146, through which the wire (not shown) connected to the battery management unit 160 passes and which covers the wire. By the wire case 146, the wire may be prevented from contacting air, moisture or water.

The wire case 146 may extend from the first support plate 142 toward the second inner case 150. As another example, the wire case 146 may extend from the second inner case 150 toward the first inner case 141. Alternatively, two wire cases may extend from the inner cases 141 and 150 to be connected to each other or brought into contact with each other. The wire case 146 may be spaced apart from the plurality of cell cases 143 and extend in a direction parallel to the extension direction of each cell case 143.

The second inner case 150 may include a wire hole 157 through which the wire passes. When the second inner case 150 is coupled with the first inner case 141, the wire hole 157 may be aligned with the wire case 146. The wire (not shown) connected to the conductor (not shown) located in the second inner case 150 may pass through the wire case 146 to be connected to the battery management unit 160.

The second inner case 150 may include a second support plate 151 supporting the plurality of battery cells 170. In addition, the second inner case 150 may include a plurality of case couplers 152 respectively coupled with the plurality of cell cases 143. The plurality of case couplers 152 may extend from the second support plate 151 toward the first inner case 141.

The plurality of cell cases 143 may be inserted into the plurality of case couplers 152, respectively. In a state in which the plurality of cell cases 143 is coupled with the plurality of case couplers 152, the internal spaces of the cell cases 143 are completely divided from the external space to prevent air, moisture or water from contacting the battery cells 170 of the cell cases 143. That is, as the plurality of cell cases 143 is respectively coupled with the case couplers 152, the battery cells 170 accommodated in the cell cases 143 are prevented from being exposed.

In the present disclosure, since the case couplers 152 surround some of the battery cells 170, the case couplers 152 may serve as a cell case. That is, the first inner case 142 may include a first cell case and the second inner case 150 may include a second cell case coupled with the first cell case 142.

As another example, the plurality of case couplers 152 may be openings provided in the second support plate 151. Even in this case, the cell cases 143 may be inserted into the openings.

A plurality of holes 154, in which conductors for connecting the battery cells 170 are located, may be formed even in the second support plate 151. The diameter of the plurality of holes 154 may be less than that of the battery cells 170.

An extension rib 156 may be formed on the second support plate 151. The extension rib 156 may extend upwardly from the edge of the second support plate 151.

The extension rib 156 prevents the wire connected to the conductor provided in the second support plate 151 from being pressurized by the first outer case 121. That is, when the extension rib 156 is brought into contact with the first outer case 121, a space may be formed between the first outer case 121 and the second support plate 151. As the wire is located in the space, the first outer case 121 may not pressurize the wire to prevent the wire from being damaged.

Figure 8:
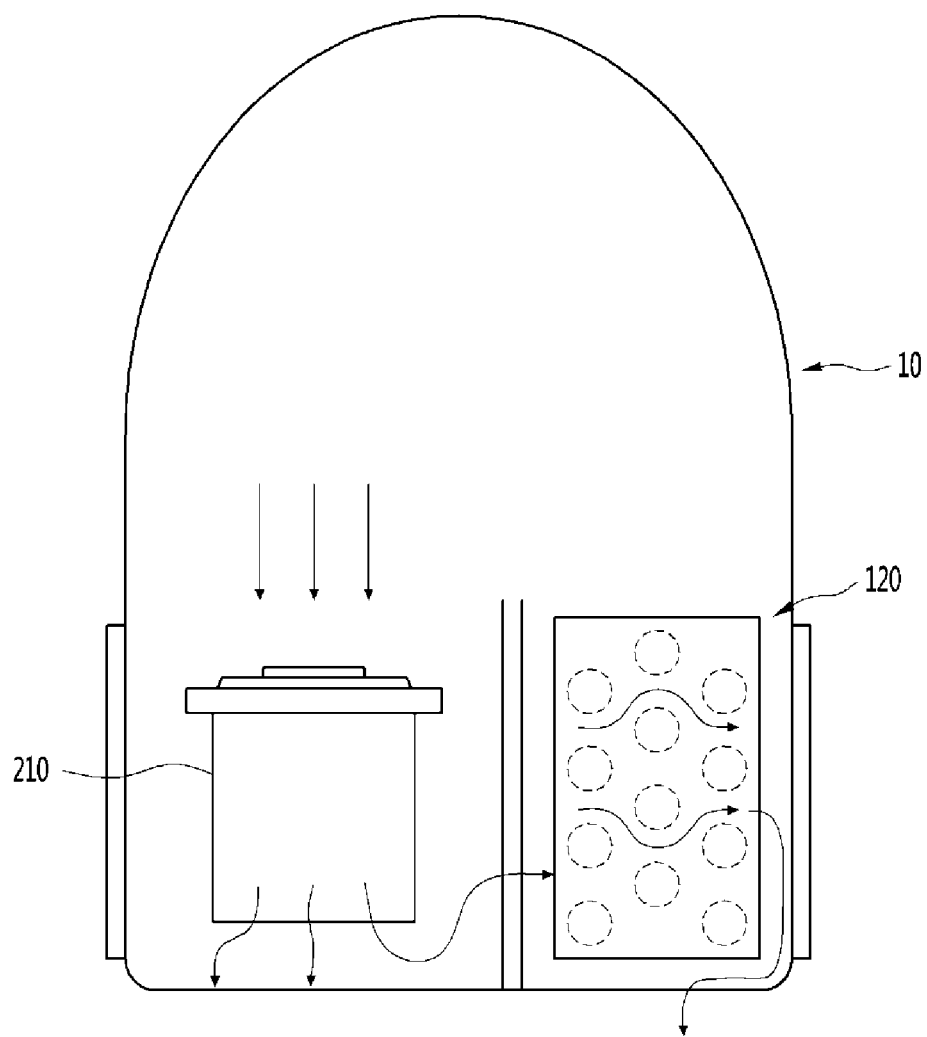
FIG. 8 is a diagram showing a state in which the battery assembly mounted in a cleaner body is cooled.

FIG. 8 is a diagram showing a state in which the battery assembly mounted in a cleaner body is cooled. Referring to FIG. 8, when the suction motor 210 operates, air flow occurs by suction force of the suction motor 210. Then, dust and air are introduced into the cleaner body 10 through the suction device 20, a dust separation process is performed and then air passes through the suction motor 210. Some of air passing through the suction motor 210 is immediately discharged from the cleaner body 10 and the remaining air is discharged from the cleaner body 10 after cooling the battery assembly 120.

According to the present disclosure, since the battery cells are respectively located in the cell cases, the battery cells can be cooled by air and dust included in the air can be prevented from contacting the battery cells. That is, according to the present disclosure, dustproof performance can be improved.

Figure 9:
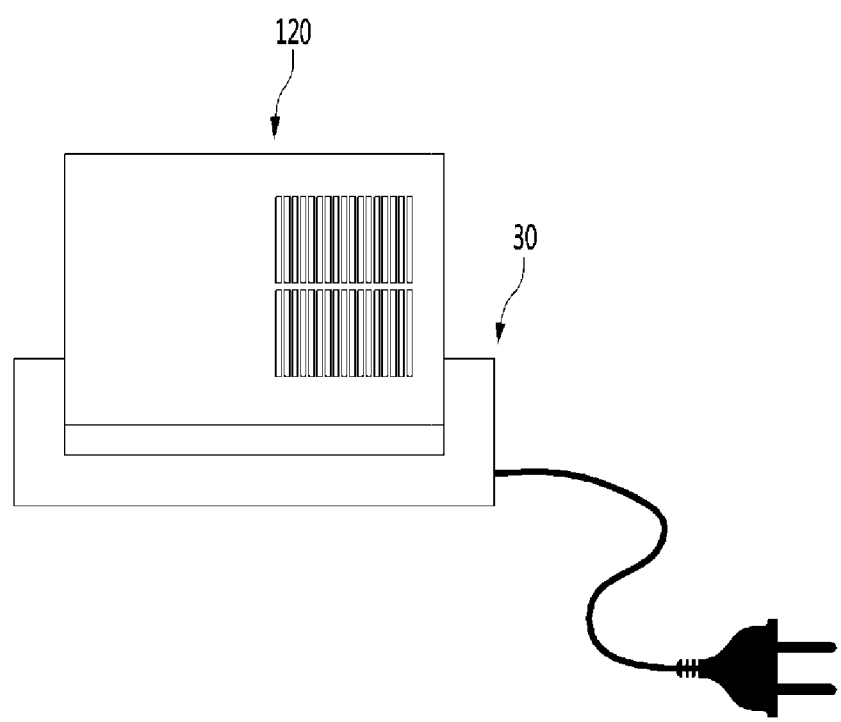
FIG. 9 is a diagram showing a state in which the battery assembly of the embodiment is seated on a charging stand.

FIG. 9 is a diagram showing a state in which the battery assembly of the embodiment is seated on a charging stand. Referring to FIG. 9, the battery assembly 120 separated from the cleaner body 10 may be seated on the charging stand 30. When the battery assembly 120 is seated on the charging stand 30, the battery assembly 120 may be charged.

Since the flow holes, in which air flows, are formed in the outer case 121, water or moisture may be introduced through the flow hole. However, since the battery cell is accommodated in the cell case, even when moisture or water is introduced into the outer case 121 through the flow hole, moisture or water may be prevented from contacting the battery cells. That is, according to the present disclosure, dustproof performance can be improved.

The present disclosure may provide a vacuum cleaner and battery assembly capable of preventing a battery cell from contacting with water or moisture while efficiently cooling the battery cell. A vacuum cleaner may comprise a cleaner body including a suction motor to generate suction force, a suction unit communicating with the cleaner body and suctioning air and dust, and a battery assembly to supply power to the suction motor, the battery assembly includes a plurality of battery cells, an inner case including a plurality of cell cases in which a plurality of battery cells respectively is accommodated and spaced apart from each other, and an outer case in which the inner case is accommodated and including a flow hole in which air flows, and the inner case includes a first inner case including the plurality of cell cases, and a second inner case including a plurality of case couplers coupled with the plurality of cell cases to prevent the plurality of battery cells respectively accommodated in the plurality of cell cases from being exposed.

According to another aspect of the present disclosure, a vacuum cleaner may comprise a cleaner body including a suction motor to generate suction force, a suction unit communicating with the cleaner body and suctioning air and dust, and a battery assembly to supply power to the suction motor, and the battery assembly includes a plurality of battery cells, an inner case including a plurality of cell cases in which a plurality of battery cells is respectively accommodated and spaced apart from each other and a wire case spaced apart from the plurality of cell cases and accommodating a wire therein, and an outer case in which the inner case is accommodated therein and including a flow hole in which air flows.

A battery assembly may comprise an inner case including a plurality of cell cases spaced apart from each other, a plurality of battery cells respectively accommodated in the plurality of cell cases, and an outer case in which the inner case is accommodated, and the inner case includes a first inner case including the plurality of cell cases and a second inner case including a plurality of case couplers coupled with the plurality of cell cases to prevent the plurality of battery cells respectively accommodated in the plurality of cell cases from being exposed.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it will be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vacuum cleaner comprising:
    a cleaner body including a suction motor to generate suction force;
    a cleaner head communicating with the cleaner body to receive the suction force and to suction air and dust based on the suction force; and
    a battery assembly to supply power to the suction motor, wherein the battery assembly includes:
        a plurality of battery cells;
        an inner case including a plurality of cell cases to accommodate, respectively, the plurality of battery cells and to space apart the plurality of cell cases from each other; and
        an outer case in which the inner case is accommodated, the outer case including a flow hole through which air flows into the inner case and between the plurality of cell cases,
    wherein the inner case further includes:
        a first inner case providing the plurality of cell cases; and
        a second inner case providing a plurality of case couplers coupled to an end of the plurality of cell cases,
    wherein a number of the plurality of cell cases is equal to a number of the plurality of battery cells,
    wherein the each of the plurality of cell cases has a cavity, and
    wherein when the plurality of cell cases are coupled to the plurality of case couplers, the cavities of the plurality of cell cases are completely divided from an external space outside of the cell cases to prevent air, moisture, or other contaminant from contacting the plurality of battery cells accommodated in the cell cases.

2. The vacuum cleaner of claim 1, wherein the battery assembly is detachably mounted in the cleaner body.

3. The vacuum cleaner of claim 1, wherein:
    the first inner case includes a first support plate,
    the second inner case includes a second support plate,
    the plurality of cell cases extends from the first support plate, and
    the plurality of case couplers extends from the second support plate and toward the plurality of cell cases.

4. The vacuum cleaner of claim 3, wherein a first plurality of holes corresponding to the plurality of cell cases is formed in the first support plate, and a second plurality of holes corresponding to the plurality of case couplers is formed in the second support plate, and conductors electronically coupled to the plurality of battery cells are located in the first and second pluralities of holes.

5. The vacuum cleaner of claim 4, wherein an extension rib extending toward the outer case is provided on an edge of the second support plate, and wherein the extension rib defines a cavity between the outer case and the second support plate to receive a wire electronically coupled to one or more of the conductors within the second plurality of holes.

6. The vacuum cleaner of claim 4, wherein a diameter of a hole of the first or the second pluralities of holes is less than a diameter of a battery cell of the plurality of battery cells.

7. The vacuum cleaner of claim 1, wherein the battery assembly further includes a battery management module to manage voltages of the plurality of battery cells, and wherein the battery management module is accommodated in the outer case.

8. The vacuum cleaner of claim 7, wherein:
    the inner case includes a wire case through which a wire electrically connected to the battery management module passes, and
    the wire case is spaced apart from the plurality of cell cases and extends in a direction parallel to an extension direction of the plurality of cell cases.

9. The vacuum cleaner of claim 7, further comprising a partitioning plate provided between the plurality of battery cells and the battery management unit,
    wherein the battery management unit is positioned perpendicular to the plurality of battery cells.

10. The vacuum cleaner of claim 9, wherein:
    the outer case further includes a supporter to support the partitioning plate, and the partitioning plate is spaced apart from the plurality of battery cells and the battery management unit when positioned on the supporter.

11. The vacuum cleaner of claim 1, wherein the outer case includes:
a first outer case; and
a second outer case coupled with the first outer case and supporting the inner case.

12. The vacuum cleaner of claim 11, wherein the plurality of cell cases are spaced apart from the first outer case and the second outer case.

13. The vacuum cleaner of claim 11, wherein:
the inner case includes a fastening rib, and
the second outer case includes a rib accommodation channel in which the fastening rib of the inner case is received.

14. The vacuum cleaner of claim 13, further comprising a sealing member inserted within the rib accommodation channel,
wherein the fastening rib of the inner case is seated on the sealing member when received in the rib accommodation channel.

15. The vacuum cleaner of claim 1, wherein the plurality of cell cases prevent the plurality of battery cells, when accommodated in the plurality of cell cases, from being exposed to the air flowing between the plurality of cell cases.

16. A vacuum cleaner comprising:
a cleaner body including a suction motor to generate suction force;
a cleaner head communicating with the cleaner body to receive the suction force and to suction air and dust based on the suction force; and
a battery assembly to supply power to the suction motor, wherein the battery assembly includes:
a plurality of battery cells;
an inner case including a plurality of cell cases accommodating a plurality of battery cells and being spaced apart from each other, and a wire case spaced apart from the plurality of cell cases and accommodating a wire therein; and
an outer case accommodating the inner case and including a flow hole in which air flows,
wherein a number of the plurality of cell cases is equal to a number of the plurality of battery cells,
wherein the each of the plurality of cell cases has a cavity, and
wherein when the plurality of cell cases are coupled to the plurality of case couplers, the cavities of the plurality of cell cases are completely divided from an external space outside of the cell cases to prevent air, moisture, or other contaminant from contacting the plurality of battery cells accommodated in the cell cases.

17. The vacuum cleaner of claim 16, wherein the wire case extends in a direction parallel to an extension direction of the cell cases.

18. The vacuum cleaner of claim 16, wherein:
the inner case includes a first inner case and a second inner case, and
one of the first inner case or the second inner case includes the wire case and another one of the first inner case or the second inner case includes a wire hole through which the wire passes, the wire hole being aligned with the wire case.

19. The vacuum cleaner of claim 16, wherein:
the battery assembly further includes a battery management module to manage voltages of the plurality of battery cells, the battery management module being provided within the outer case, and
the wire passing through the wire case is electrically coupled to the battery management module.

20. A battery assembly comprising:
an inner case including a plurality of cell cases spaced apart from each other;
a plurality of battery cells at least partially contained in the plurality of cell cases; and
an outer case that receives the inner case,
wherein the inner case includes:
a first inner case that includes the plurality of cell cases; and
a second inner case that includes a plurality of case couplers coupled to ends of the plurality of cell cases, wherein the plurality of cell cases and the plurality of case couplers combine to define cavities to receive the plurality of battery cells,
wherein a number of the plurality of cell cases is equal to a number of the plurality of battery cells,
wherein the each of the plurality of cell cases has a respective one of the cavities, and
wherein when the plurality of cell cases are coupled to the plurality of case couplers, the cavities of the plurality of cell cases are completely divided from an external space outside of the cell cases to prevent air, moisture, or other contaminant from contacting the plurality of battery cells positioned in the cell cases.

* * * * *